Dec. 24, 1963  S. O. BENDER ETAL  3,115,589
ELECTROMAGNETIC STEPPING MOTOR
Filed Oct. 23, 1961  4 Sheets-Sheet 1
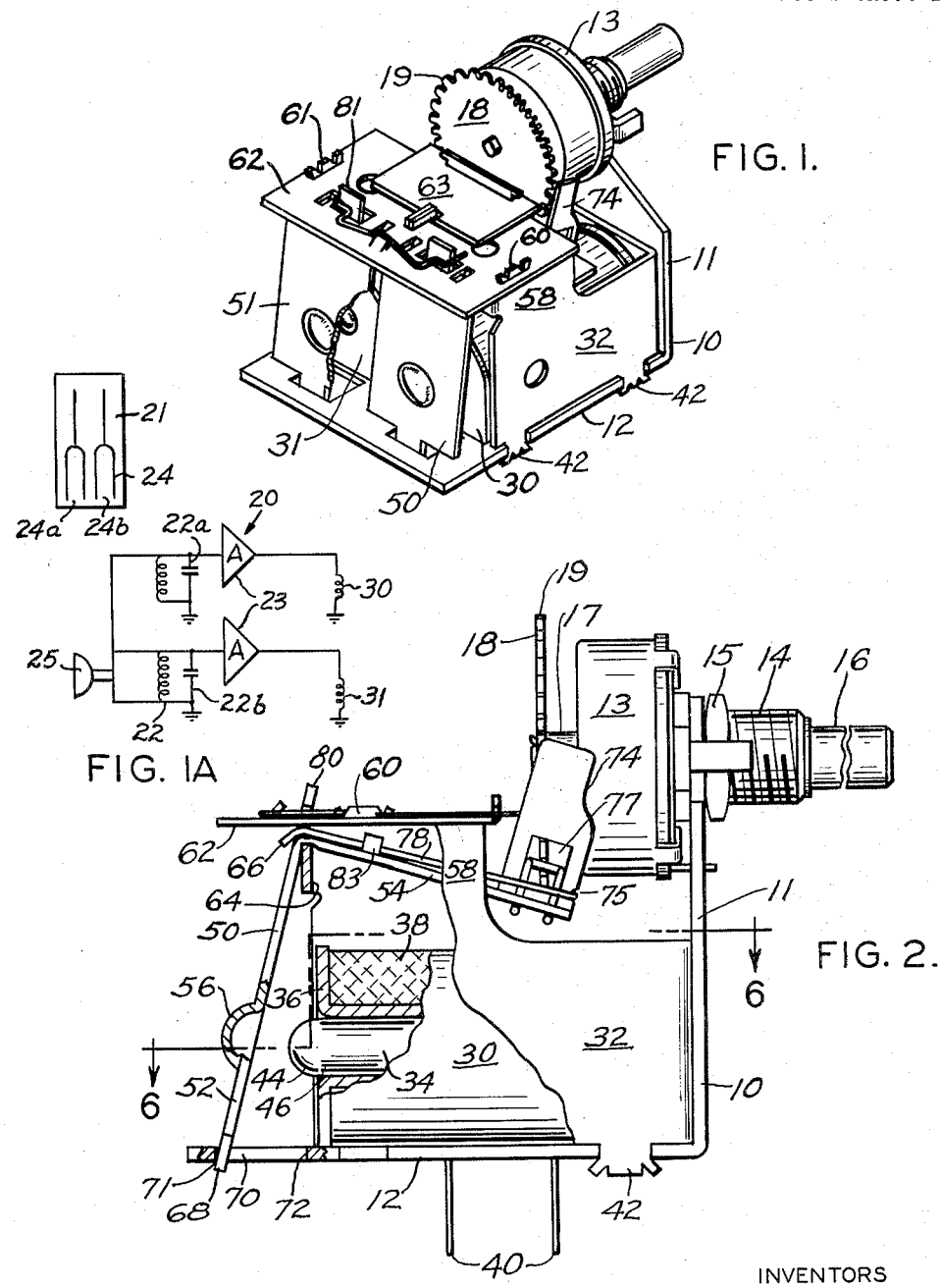
INVENTORS
STANLEY O. BENDER
WAYNE A. BARDEN
BY *Jennings B. Thompson*
ATTORNEY INVENTORS
STANLEY O. BENDER
WAYNE A. BARDEN
BY *Janning B. Thompson*
ATTORNEY Dec. 24, 1963  S. O. BENDER ETAL  3,115,589
ELECTROMAGNETIC STEPPING MOTOR
Filed Oct. 23, 1961  4 Sheets-Sheet 3

INVENTORS
STANLEY O. BENDER
WAYNE A. BARDEN
BY *Jennings B. Thompson*
ATTORNEY

Dec. 24, 1963  S. O. BENDER ETAL  3,115,589
ELECTROMAGNETIC STEPPING MOTOR
Filed Oct. 23, 1961  4 Sheets-Sheet 4
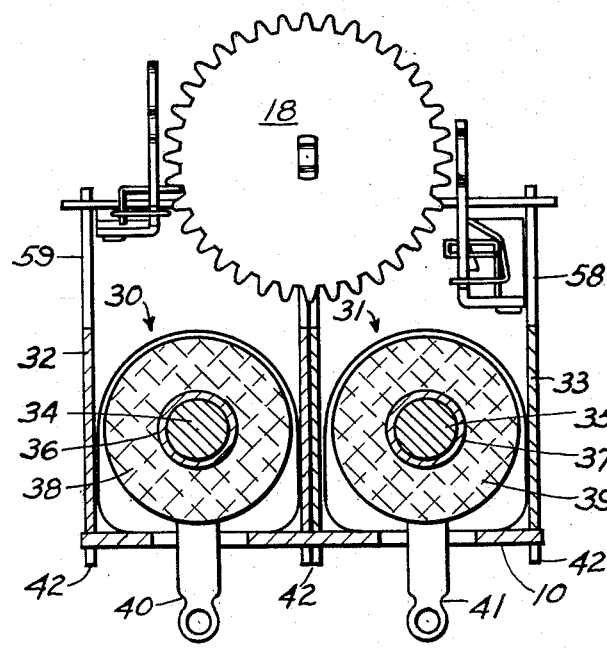
FIG. 8.
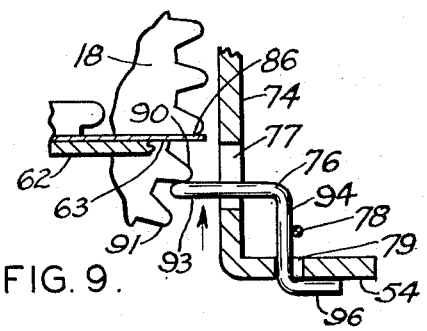
FIG. 9.
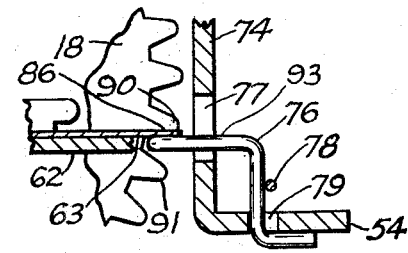
FIG. 10.
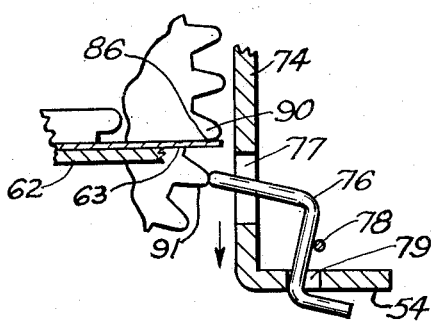
FIG. 12.
FIG. 11.
INVENTORS
STANLEY O. BENDER
WAYNE A. BARDEN
BY *Jennings B. Thompson*
ATTORNEY

United States Patent Office 3,115,589
Patented Dec. 24, 1963

3,115,589
ELECTROMAGNETIC STEPPING MOTOR
Stanley O. Bender, Asheville, N.C., and Wayne A. Barden, Elkhart, Ind., assignors to CTS Corporation, Elkhart, Ind., a corporation of Indiana
Filed Oct. 23, 1961, Ser. No. 146,747
15 Claims. (Cl. 310—21)

This invention relates generally to an electromagnetic stepping device and in particular to an electromagnetic stepping device for rotating the shaft on an electrical control an incremental distance each time the device is energized.

This invention is the result of the increased popularity of television sets which can be operated from the confines of an easy chair located across the room from the set. These sets are all provided with means for tuning the sets remotely. But, since the signal received from each station varies, it is necessary that the volume of the set be remotely adjustable also. It is toward the remote adjustment of the volume of a television set that this invention is specifically directed. However, it is equally applicable to controls other than volume controls, and further, the useful applications of the invention are not limited to remote control situations since the device would operate the same whether operated remotely or not.

A device of this type must have the following characteristics: it must be capable of rotating the shaft of the control in either direction; it must be capable of making relatively small adjustments in the control; it must respond rapidly when energized; it must require a minimum amount of power; and it must rotate the control the same predetermined amount each time the device is energized.

It is the principal object of this invention to provide an electromagnetic stepper which has all of these characteristics. It is an additional object of this invention to provide such a stepper which contains a minimum number of parts which are arranged for easy assembly and adjustment so that the stepper can be economically manufactured. It is a further object of this invention to provide a reliable stepping device and to generally improve their design.

The invention consists of two electromagnets each equipped with an armature. The armatures are L-shaped and pivotally mounted so that one leg extends across the end of the electromagnet so that it will be influenced by the magnetic field created when the electromagnet is energized. The other leg extends generally perpendicularly from the first. This latter leg carries a tooth engaging means or pawl which engages teeth provided on the periphery of a disc mounted on the shaft of the control to be adjusted when the armature is pivoted by the electromagnet. The distance the armature can pivot in each direction is limited and spring means are provided to bias the armatures away from the ends of the electromagnets. The tooth engaging means or pawl of each armature engages the tooth wheel on opposite sides so that the direction of rotation of the shaft is controlled by energizing the desired electromagnet.

Another important feature of the invention is the unique arrangement of the parts which prevents overtravel of the toothed wheel. Overtravel, if not prevented, would result due to the speed with which the relay operates. When the electromagnet is energized, the armature is drawn toward it with great speed which, in turn, causes a rapid rotation of the toothed wheel. This rapid rotation imparts sufficient momentum to the wheel to cause it to rotate some distance beyond that desired. Actually, overtravel would not be undesirable if it was always the same amount, but it varies greatly so it must be eliminated. Obviously, it would be undesirable to have the volume of a television set change different and unpredictable amounts each time an adjustment was made.

To prevent overtravel, a novel arrangement of parts is provided. The tooth engaging means or pawls is arranged to engage both the tooth it is driving and the tooth following at the time the armature reaches the end of its power stroke. In addition, resilient means are arranged to engage the pawl just before the armature reaches the end of its power stroke. Then, as the toothed wheel continues to rotate due to its own inertia, the pawl will be held in engagement with the following tooth by the resilient means, and will exert a braking force on the wheel. When the wheel is stopped, the resilient means will then cause the pawl to rotate the wheel back to approximately the point where the resilient means first contacted the pawl. With this arrangement, the overtravel of the toothed wheel may vary as conditions dictate, but the effective distance the wheel is rotated with each energization is maintained constant.

An added benefit of this system of preventing overtravel results from the fact that the resilient means in forcing the pawl to travel a short distance in the opposite direction at the completion of the power stroke helps move the armature away from the end of the electromagnet and out of the influence of any magnetic field present as a result of residual current in the remote control circuit.

That the invention fulfills the above specifically mentioned objects as well as other objects not specifically mentioned will be fully understood when the detailed description below is considered along with the attached drawings, in which:

FIGURE 1 is an isometric view of the invention;

FIGURE 1a is a schematic circuit for selectively energizing the electromagnetic stepping device;

FIGURE 2 is a side view of the stepper of FIGURE 1 with a portion cut away to illustrate some of the inner construction features;

FIGURE 8 is a sectional view taken along line 8—8 of FIGURE 4;

FIGURE 9 illustrates the relative positions of the pawl carried by the armature, the toothed wheel, and the overtravel limiting spring when the pawl initially engages the toothed wheel;

FIGURE 10 illustrates the relative positions of the members in FIGURE 9 when the pawl is either first contacting the spring on the power stroke or is just completing the reverse rotation of the toothed wheel to remove the overtravel;

FIGURE 11 shows the members when the toothed wheel has reached the end of its rotation and has been stopped by the spring and the pawl;

FIGURE 12 shows the pawl moving out of engagement with the toothed wheel on the downstroke.

Figure 3:
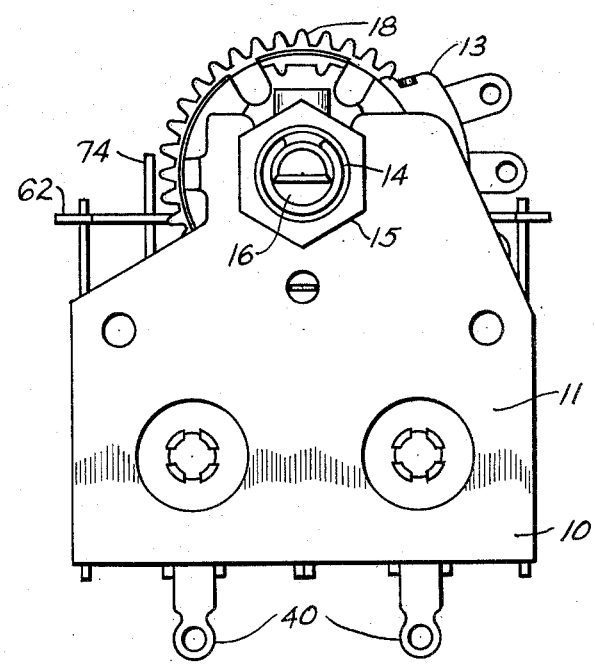
FIGURE 3 is a front view of the stepper.

In the preferred embodiment of the invention, the stepper and the control which it adjusts are both supported by the same integral housing 10. This housing comprises an L-shaped bracket having a leg 11 which extends upward and supports the control 13, and the leg 12 which extends perpendicularly from the leg 11 and supports the stepper.

In the drawings, the control is shown as a variable resistor which it would be in a volume control application. It is equipped with the conventional mounting bushing 14 and nut 15 which secure the control to housing 10. The shaft 16 has an extension 17 which extends outward from the back of the control parallel to the leg 12 of the housing 10. Attached to this shaft extension is the disc 18 equipped with peripheral teeth 19. This toothed wheel 18 is rigidly attached to the shaft extension 17 so that as it is rotated by the stepper in the manner hereinafter described it will change the setting of the variable resistor 13.

The two electromagnets of the control, designated 30 and 31, are mounted in U-shaped housings 32 and 33, respectively. These housings should be made of material having a high permeability such as steel so that the reluctance of the magnetic circuit of each electromagnet will be a minimum. In other words, these housings provide a path for the field created by the electromagnets when energized and tend to confine the field within them.

The electromagnets are identical so only one will be described in detail. As shown in FIGURE 2 the electromagnet 30 contains a metal core 34 which extends the length of the electromagnet. Surrounding the core 34 is a nylon spool 36 upon which is wound the wire coil 38. The core is equipped with a spherical end 44 to reduce the initial air gap between it and its armature. The diameter of this spherical end 44 is slightly less than the diameter of the core, to provide a shoulder 46 which is staked as shown in FIGURE 2 to keep the spool in position on the core. The other end of the core 34 extends through an opening provided in the U-shaped housing so that it can be staked as shown at 43 to securely attach the electromagnet to its housing. Each U-shaped housing in turn is provided with tabs 42 which extend through slots provided in leg 12 of housing 10 which when staked securely attach the U-shaped housings and in turn the electromagnets to the housing 10.

As can be seen from the drawings, the two electromagnets are mounted so that their cores are parallel to the control shaft 16 of the variable resistor 13 and to each other. Terminals 40 are provided to connect the electromagnets into the desired circuit.

The circuit 20 for selectively energizing the coils 30 and 31 is shown in FIGURE 1a and comprises a transducer 21, a discriminator 22, and an amplifier 23. The transducer 21 generally is provided with a pair of tuning forks 24, one of the forks 24a being tuned to a lower frequency, e.g., 8,000 cycles, and the other fork 24b being tuned to a higher frequency, e.g., 10,000 cycles.

When it is desired to alter the relative position of the control 13, the operator manually strikes one of the tuning forks 24 by pushing a button located on the transducer 21 remotely located from the discriminator 22. Generally, the fork tuned to the higher frequency increases the setting of the control 13, i.e., it energizes a switch in the control 13 or increases the volume of a television set, while the fork tuned to the lower frequency decreases the setting of the control, that is, it decreases the volume of the television set or opens the switch in the control 13 to turn off the set.

The frequency waves emanating from the tuning fork, e.g., 24a, are picked up by a microphone 25 which converts the sound waves into small electrical pulses of the same frequency. The microphone is connected to the discriminator 22, namely a pair of tuned circuits 22a and 22b, one of the tuned circuits passing the electrical pulses of the higher frequency and the other tuned circuit passing the pulses of the lower frequency.

The electrical pulses are then fed generally into a single or double stage amplifier which amplifies the small electrical pulses sufficiently to energize one of the coils 30 or 31 connected to the amplifier. Thus, depending upon the frequency emanating from the transducer, one of the coils 30 or 31 of the electromagnetic stepping device is energized and rotates the toothed wheel 18 a predetermined angle clockwise or counterclockwise.

Extensions 58 and 59 extend upward and are integrally connected to the U-shaped housings 32 and 33 respectively. These extensions extend in the direction of the control shaft and are used generally to provide support for bearings for the armatures, and to provide support for the plate 62. Tabs 60 and 61 extend upward from the extensions through slots in the plate 62 and are staked to secure the plate in position.

The armatures 50 and 51 are pivotally mounted on knife edge bearings provided by the tabs 64 and 65. These tabs are integrally connected to the extensions 58 and 59 and, are very inexpensively provided by simply bending a portion of the extensions in toward each other and perpendicular to the extension.

Figure 7:
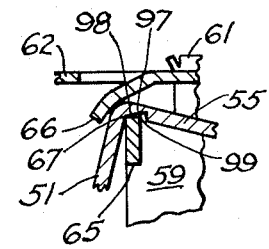
FIGURE 7 is a sectional view taken along line 7—7 of FIGURE 4 showing how the armatures are pivotally supported.

Holding the armatures on their bearings are the fingers 66. These fingers are sheared out of the plate 62 directly above the bearings and bent downward as shown in FIGURE 7 until they are practically in engagement with the armatures. In fact, the clearance should be no more than is consistent with good bearing design so that there is as little relative movement between the armature and its bearing as possible. The clearance that must be maintained between the tab and the armature is directly proportional to the distance between the tab and the pivot point of the armature.

Originally the armature was formed from a flat piece of metal then bent into the L-shape illustrated. When this armature was placed on the bearing tabs 64 and 65, however, it was discovered that a large clearance had to be maintained between the armatures and the tabs 66 because the armatures were pivoting around the edge 99 of the tabs. This caused the point on the armatures adjacent the tabs to move a considerable distance when the armature pivoted on the bearing.

To reduce the amount of movement of the armature adjacent the tabs, it was necessary to shift the pivot point of the armatures toward the tabs 66 as much as possible. This could be done without having to alter or machine the tabs 64 and 65, i.e., by shifting the pivot point from the edge 99 to the edge 67 of the tab. This was done by forming the groove 97 illustrated in FIGURE 7.

This groove is formed by upsetting the metal at the same time the armature is bent into its L-shape. The groove has an inclined bottom surface 98 which forms an angle with the plane of the leg of the armature in which it is formed equal to or greater than the angle of rotation of the armature around its pivot. This results in the shifting of the pivot point of armature from the edge 99 to the edge 67.

This reduces the distance between the pivot point of the armature and the tabs 66 to a minimum and allows the tabs to be located very close to the armature. These tabs, in effect, combine with the edge 67 of the tabs 64 and 65 to provide a complete journal bearing for the armatures.

The armatures are L-shaped and are pivotally mounted as described above so that one leg extends downward in front of the electromagnets while the other leg extends generally backward above the electromagnets. For example, armature 50 has leg 52 which extends down across the front of electromagnet 30 and it also has leg 54 which extends generally backward above the electromagnet 30. The armatures are identical except that one is arranged to operate on the opposite side of the toothed wheel from the other, so only one will be described in detail.

Both armatures are equipped with extensions which extend into openings 70 in the leg 12 of housing 10. These openings are designed to limit the distance the armatures can rotate. For example, as shown in FIGURE 2, the extension 68 on armature 50 extends into the opening 70 provided therefor in leg 12. The armature then can oscillate only the distance necessary to move the extension 68 from the side 71 to the side 72 of the opening 70.

Figure 6:
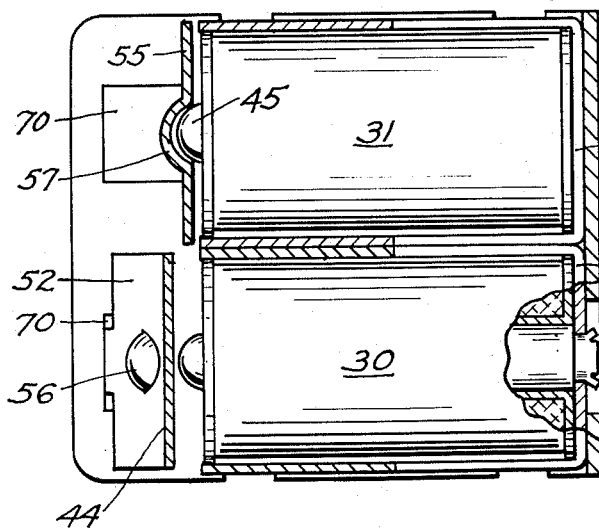
FIGURE 6 is a sectional view taken along line 6—6 of FIGURE 2.

The stop 72 is arranged to prevent the armature from engaging the core of the electromagnet. This is illustrated in FIGURE 6 where a section is taken through the armature when in its nearest position to the electromagnet. As shown, an air gap is maintained between the spherical end of the core 45 of the electromagnet 31, and the spherical cavity 57 formed in the armature to receive the end of the core. It is desirable to maintain this air gap for, as will be discussed later, in most circuits in which this stepper will operate a certain amount of residual current will be present at all times. This current would be sufficient to hold the armature in against the electromagnet even after the main current has been switched off if the armature was allowed to contact the core.

Figure 4:
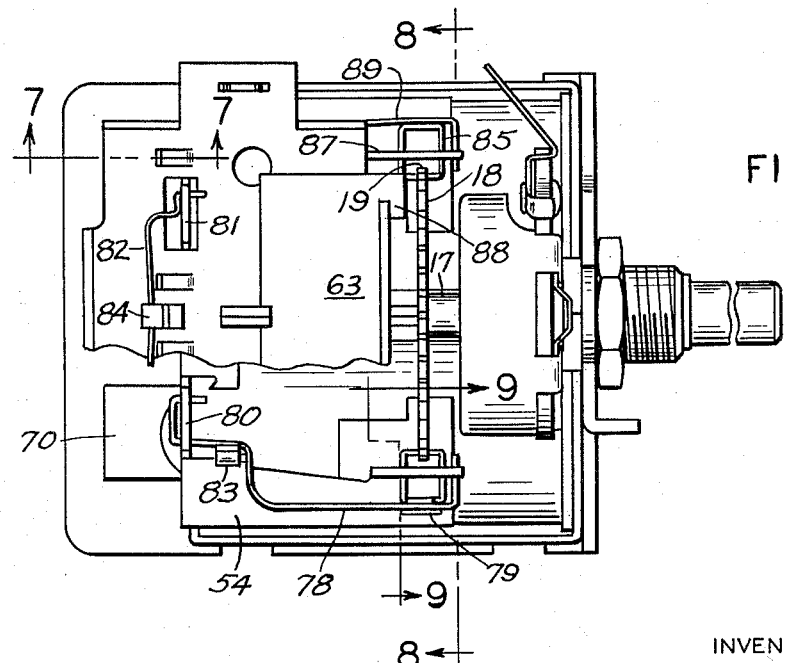
FIGURE 4 is a top plan view of the stepper with a portion of the top plate broken away to show the shape of the armature, etc.
Figure 5:
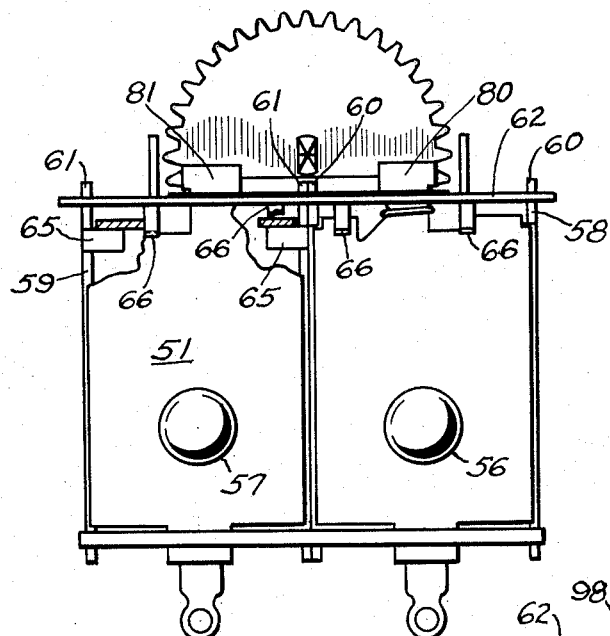
FIGURE 5 is a rear view of the stepper.

Extending upward from the armatures and formed integrally therewith are the spring tabs 80 and 81. These tabs extend through openings in the plate 62 and are engaged by spring 82 in the manner shown in FIGURE 4. Spring 82 is stressed when the armatures are pulled toward the electromagnet and it is the function of spring 82 to move the armatures back away from the electromagnets after the electromagnets are de-energized. In other words, it is the purpose of spring 82 to urge the armatures into the position shown in FIGURE 2.

As stated above, each armature has a leg which extends generally backward above the electromagnets. For example, armature 50 has leg 54 which extends backward above the electromagnet 30 and is positioned so as to be on the opposite side of the tooth engaging means comprising the pawls 76 and 85, the upright members 74 and 87, and pawl springs 78 and 89.

Figure 13:
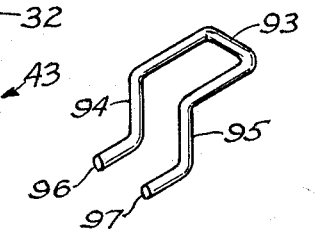
FIGURE 13 is an isometric view of the pawl.

The pawls are made from spring wire which is formed in the shape illustrated in FIGURE 13. Spring wire is uniquely suited to this application since it is readily formed and yet provides a rounded surface to engage the teeth on the toothed wheel without requiring additional machining.

As illustrated, the pawl is formed from wire so as to have a horizontal U-shaped portion 93, the bight of which engages the teeth on the wheel 18, two vertical legs 94 and 95 and two horizontal extensions 96 and 97 which extend in the opposite direction from the tooth engaging portion 93 but in a generally parallel plane. The pawls and the other members which make up the tooth engaging means carried by each armature are the same, the only difference being that each is arranged to engage opposite sides of the toothed wheel.

The leg 54 of the armature 50 has attached thereto the upright member 74, which supports the pawl 76. The pawl extends outward in the direction of the toothed wheel through the opening 77 in the member 74 so that it will engage a tooth when the leg 52 of the armature is pulled toward the electromagnet. Maintaining the pawl in the position shown in FIGURE 9 is the pawl spring 78 which is formed in the manner shown in FIGURE 4. One end of the spring hooks around and is anchored to the spring tab 80; the other end extends along the center section of the pawl and hooks in the end of the armature in the notch 75 provided in the upright member 74. The notch maintains the spring in the proper position on the pawl. This spring simply serves to resiliently hold the pawl in the position indicated in FIGURE 9, which is the tooth engaging position.

The design of the pawl is unique in that it requires no fixed axis around which to pivot. This greatly simplifies the assembly of the stepper but of greater importance, it allows the pawls to adjust to meet varying dimensions in other component parts, thus making their manufacture less costly.

The only remaining undescribed member of the stepper is the overtravel preventing spring 63 carried by the plate 62. This spring consists of a flat, relatively thin sheet of resilient material which is securely attached to the plate 62 so that its two edges 86 and 88 are in position to engage the pawls 76 and 85 as they approach the top of their power stroke.

Having described the physical aspects of the stepper, the function of each of these members will now be described as we discuss the operation of the unit.

*Operation*

As stated at the outset, this invention is particularly advantageous when used to remotely control the volume of a television set. In most television sets which are equipped for remote control, there exists independent of the television circuit or chassis a remote control circuit or chassis. In some sets this circuit is turned off when the set is turned off; while in others, it is left on at all times allowing the set to be turned on as well as off by the remote control system. With either system, the principle of operation of the invention is the same.

The terminals 40 of the electromagnets are connected into the remote control chassis so that the appropriate signal will energize the appropriate electromagnet. Signals of different frequencies are generally used, one which will energize one electromagnet and one which will energize the other. This allows the operator to select which electromagnet he will energize and thereby elect whether he wants to increase or decrease the volume of his set—each electromagnet turning the toothed wheel in opposite directions and, consequently, either reducing or increasing the volume of the set depending upon the arrangement of the variable resistor.

In operation, then the television viewer will press either one of two buttons to either increase or decrease the volume of the set. If, for example, he presses the button which energizes the electromagnet 30 the following will happen: A magnetic field will be created by the electromagnet which will draw the leg 52 of the armature 50 toward the end of the electromagnet. As the armature is drawn toward the electromagnet, it pivots around the tabs 66, and the leg 54 of the armature moves upward in a direction generally tangent to the toothed wheel 18.

Now referring specifically to FIGURES 9–11, the action of the pawl in connection with the rotation of the toothed wheel will be described. In FIGURE 9, the pawl is just engaging tooth 90 on the toothed wheel 18. In this position, the pawl which as described above comprises the tooth engaging section 93, the upright sections 94 and 95, and the heel sections 96 and 97, is held against rotation in the counterclockwise direction and, therefore, will carry the tooth 90 along with it as it moves upward with the armature. In FIGURE 10, the armature leg 54 has moved upward to the point where the tooth engaging section 93 of the pawl has engaged the edge 86 of the spring 63. At approximately this point, the armature has reached the end of its travel toward the electromagnet and is being held in spaced relation from the end of the electromagnet by the stop 72.

When the electromagnet is energized, it pulls the armature toward it very rapidly, which in turn imparts considerable momentum to the toothed wheel. This momentum causes the wheel to continue rotating after the armature stops and results in overtravel. This overtravel is shown in FIGURE 11 greatly exaggerated, of course, but illustrates how each one of these various parts functions in order to remove the effect of this overtravel. As shown, the toothed wheel has rotated to the point where it has raised the pawl 76 away from the side of the opening 77 and has also caused the tooth engaging section 93 of the pawl 76 to stress the edge 86 of the spring 63 in the same manner as shown in FIGURE 11. It will be noticed that the size of the tooth engaging section of the pawl is such that it engages both tooth 90 and the following tooth 91 at their root. In this way, the tooth 91 actually forces the tooth engaging section of the pawl to exert this deflecting force on the edge 86 of the spring 63.

Assuming, for example, that the amount of overtravel is as shown in FIGURE 11, the spring 63 is exerting a braking force on the tooth 91 through the tooth engaging section of the pawl. This force has been gradually increasing as the members move from the position shown in FIGURE 10 to that of FIGURE 11. At this point, the spring 63 is exerting enough force to stop the rotation of the toothed wheel 18. Immediately after stopping the rotation of the wheel in one direction, the spring 63 begins to cause it to rotate in the opposite direction until the members are returned to the position shown in FIGURE 10.

The function of the spring 63 then is to reduce the overtravel of the toothed wheel so that in effect the wheel moves the same incremental distance each time the stepper is actuated. In the commercial embodiment of this invention, this occurs so rapidly that the operator is completely unaware that the wheel has actually traveled farther than desired.

In most applications, the spring 63 has sufficient strength to stop the rotation of the wheel 18. However, should an unusually large amount of current be applied to the electromagnets, the wheel may have sufficient momentum to bend the spring 63 far enough to allow the pawl to escape past its end. To prevent this from occuring, the upright member 100 is attached to the plate 62 so that the notches 101 and 102 are in position to engage the spring 63 after it has been deformed a predetermined distance. When the spring contacts the notch, its effective length is drastically reduced causing a large increase in its spring rate. This stiffens the spring sufficiently to stop the wheel before the pawl can escape.

The electromagnet is then de-energized and the armature is forced back to the position shown in FIGURE 2 by the action of the spring 82. Usually the deenergization of the electromagnet occurs simultaneously with the reaching of the end of its travel by the armature so that the action of the spring 63 also serves to give the armature a push away from the end of the electromagnet.

In FIGURE 12, the action of the pawl as it moves out away from tooth 91 so that it will not have any tendency to rotate the wheel on the down stroke is clearly illustrated. The pawl spring 78 is very weak, and is only of sufficient strength to maintain the pawl in the position shown in FIGURE 9 so as the armature moves downward, the tooth engaging section 93 slides outward along tooth 91 stressing the spring 78 as shown in FIGURE 12. Once the pawl has cleared the end of tooth 91, the spring 78 will move it back into the position shown in FIGURE 9.

The pawl supporting member 74 and the pawl 76 continue to move downwardly until the pawl is in a non-engaging position as best shown in FIGURE 8 of the drawings. It is to be understood that although the electromagnetic stepping device shown in FIGURE 8 has one pawl in the engaging position, both pawls remain in the the non-engaging position until actuated by its respective electromagnet. The control 13 is provided with a not shown suitable friction means for retaining the toothed wheel 19 against rotation, the friction means being overcome by the engagement of one of the pawls with the toothed wheel.

As mentioned above, the action of the spring 63 in helping to move the armature away from the end of the electromagnet is important in most applications since there is a residual current present in most of these remote control circuits. It is usually very small, but it may create sufficient magnetic force in the electromagnet to hold the armature in position against its end. The spring 82 is designed, of course, to have sufficient strength to overcome this residual field current; however, the spring 63 provides an added safety factor in this respect.

From the above description, it will be apparent to those skilled in the art that this is a compact, highly efficient and simply constructed electromagnetic stepper.

The invention claimed is:

1. An electromagnetic stepper for adjusting a rotatably adjustable control comprising:
    two electromagnets;
    a pivotally mounted armature associated with each electromagnet;
    stop means arranged to limit the distance each armature can pivot away from its associated electromagnet;
    first resilient means biasing each armature toward the stop means so that each armature can be caused to oscillate between the stop means and its associated electromagnet by alternately energizing and de-energizing the electromagnet;
    an adjusting member for the control;
    a circular member equipped with teeth attached to the adjusting member;
    and tooth engaging means carried by each armature so that by energizing one electromagnet and thereby causing its associated armature to pivot away from the stop means, the tooth engaging means carried by the armature will engage the teeth on the circular member causing it to rotate an incremental distance before the armature reaches the end of its travel toward the electromagnet;
    said stepper being further characterized by the fact that the armatures are arranged on opposite sides of the circular member so that each armature rotates the circular member in opposite directions.

2. The stepper of claim 1 further characterized by the fact that the tooth engaging means comprises:
    a tooth engaging member;
    stop means arranged to prevent movement of the tooth engaging member in one direction;
    and second resilient means arranged to bias the tooth engaging member toward the last mentioned stop means so that the tooth engaging member will positively engage the teeth on the circular member when the armature moves in one direction only.

3. The stepper of claim 2 in which second stop means are provided to limit the distance each armature can travel toward its associated electromagnet.

4. The stepper of claim 3 further characterized by the fact that a third resilient means is arranged to engage the tooth engaging member just before the armature engages the second stop means, so that the third resilient means will cause the tooth engaging member to stop the rotation of the circular member and rotate the circular member a sufficient distance in the other direction to return the circular member to approximately the position it was in when said third resilient means first engaged the tooth engaging member, so that the amount the circular member is rotated with each energization of an electromagnet is constant.

5. The stepper of claim 4 in which a spring stop means is arranged to engage the third resilient means after the third resilient means has been stressed a predetermined amount to increase the force exerted on the tooth engaging member with a resultant increase in the braking force on the circular member.

6. The stepper of claim 3 in which each armature comprises:
    an L-shaped member having a first and second leg joined at their ends at approximately a 90 degree angle;
    a transverse groove provided in the second leg adjacent and parallel to the juncture of the two legs and having a bottom surface which makes an obtuse angle with the first leg; and
    support means for the armature in engagement with the bottom surface.

7. An electromagnetic stepper comprising:
    a pair of electromagnets;

armatures for the electromagnets;
said armatures being generally L-shaped and pivotally mounted so that one leg of the L is drawn toward the end of the electromagnet when the electromagnet is energized;
stop means limiting the distance the armature can pivot away from the electromagnet; resilient means urging the armature against said stop means;
a circular member equipped with teeth and mounted on a shaft;
actuating means on each armature arranged to engage the teeth on the circular member on opposite sides of the shaft for rotating the circular member in opposite directions;
said actuating means comprising:
a tooth engaging member carried by each armature;
stop means arranged to prevent movement of the tooth engaging member in one direction; and resilient means holding said tooth engaging member against said last mentioned stop means so that the tooth engaging member will positively engage a tooth on the circular member when moving in one direction only.

8. The stepper of claim 7 in which the tooth engaging member comprises:
a member attached to the armature having an L-shaped cross-section and arranged so that the first leg of the L is adjacent to the peripheral teeth of the circular member and the second leg extends away from the circular member;
an opening in each leg of the L-shaped member;
a tooth engaging pawl having a first section extending through the opening in the first leg toward the circular member, a second section extending through the opening in the second leg, and a third section attached to the end of the second section and extending away from the circular member in a direction generally parallel to the first section;
spring means biasing the second section toward the first leg;
said pawl and L-shaped member being so arranged and constructed that the first section of the pawl will engage one tooth on the circular member as the L-shaped member is moved in one direction by the armature and thereby cause the circular member to be rotated an incremental distance and to move out of engagement with the teeth on the circular member when the armature moves the L-shaped member in the opposite direction.

9. The stepper as set out in claim 8 further characterized by the fact that second stop means are provided to limit the distance each armature can travel toward its associated electromagnet; and additional resilient means are arranged to engage the first section of the pawl just before the armature engages the second stop means;
the additional resilient means being arranged to cause the pawl to rotate the circular member backward should the circular member rotate more than a predetermined amount.

10. An electromagnetic stepper for rotating the control shaft of a rotatably adjustable electrical component comprising:
an L-shaped bracket for supporting the stepper and the electrical component;
two electromagnets with U-shaped electrically conductive housings, said electromagnets and housings being attached to the bracket in parallel relationship to each other and to the control shaft of the electrical component;
an L-shaped armature pivotally supported by each U-shaped housing and having a first leg extending across one end of the electromagnet and a second leg extending approximately perpendicularly from the first leg;
stop means to limit the distance the armature can oscillate away from and toward the electromagnet;
resilient means urging the first leg of the armature away from the end of the electromagnet;
a toothed wheel attached to the control shaft;
and tooth engaging means carried by the second leg of each armature;
said tooth engaging means and armatures being arranged so that as the first leg of each armature is drawn toward the end of the electromagnet when the electromagnet is energized, the tooth engaging means engages a tooth on the toothed wheel and rotates the wheel an incremental distance;
said stepper being further characterized by the fact that the electromagnets and armatures are arranged to rotate the toothed wheel in opposite directions.

11. The stepper of claim 10 in which the tooth engaging means comprises:
a tooth engaging member;
stop means arranged to prevent relative movement between the tooth engaging member and the second leg of the armature as the armature moves in one direction;
and resilient means arranged to bias the member toward the last mentioned stop means so that the member will positively engage the teeth on the circular member when the armature moves in one direction only.

12. The stepper of claim 11 in which the bearing which pivotally supports the armature comprises:
armature supporting tabs attached to each side of each U-shaped electromagnet housing and extending inward over the end of the electromagnet;
said tabs having a top surface and two side surfaces which join to provide two edges;
a transverse groove provided in the second leg and having a bottom surface which forms an angle with the plane of the second leg equal to or greater than the angle of rotation of the armature;
said groove being located so that the supporting tab engages the inclined bottom surface of the groove, so that the top surface of the tab forms an angle with the bottom of the groove at least as large as the angle of rotation of the armature.

13. In an electromagnetic stepper, the combination of pawl means and resilient means for rotating a toothed wheel a predetermined incremental distance comprising:
a pawl comprising a first section, a second section extending approximately perpendicularly from one end of the first section, and a third section extending approximately perpendicularly from the other end of the first section and in the opposite direction from the second section;
a pawl carrying member arranged to cause the pawl to reciprocate adjacent the periphery of the toothed wheel so that the second section of the pawl engages the teeth on the toothed wheel during a portion of its reciprocation;
stop means on the member to prevent relative movement between the pawl and the member when the member is moving in one direction; first resilient means urging the pawl against the stop means; and
second resilient means arranged to engage the second section of the pawl as the member reaches the end of its travel in one direction to exert a braking force on the wheel through the second section of the pawl and to rotate the wheel back to approximately the position it was in when the resilient means engaged the pawl.

14. The combination of claim 13 in which the pawl carrying member comprises an L-shaped member having one leg extending along the periphery of the toothed wheel and the second leg extending approximately perpendicularly therefrom away from the wheel; and an opening in the second leg to receive the first section of the pawl.

15. A stepper for rotating the shaft of a control in either direction in predetermined incremental amounts comprising:
    a circular member fixed to the shaft and equipped with a plurality of teeth on its periphery;
    two armatures mounted so that they may oscillate in planes parallel to but on opposite sides of the shaft;
    tooth engaging means carried by each armature and arranged to engage the teeth on the toothed wheel and to rotate the wheel a predetermined distance when moving in one direction only;
    spring means biasing the armatures in one direction; and
    an electromagnet associated with each armature to move the armatures in the opposite direction from that urged by the springs.

References Cited in the file of this patent
UNITED STATES PATENTS

| | | |
|---|---|---|
| 2,990,723 | Holpuch | July 4, 1961 |
| 2,993,382 | Ardner | July 25, 1961 |